United States Patent
Kuroshima

(10) Patent No.: US 6,754,695 B2
(45) Date of Patent: *Jun. 22, 2004

(54) SERVER DEVICE THAT MANAGES A STATE OF A SHARED DEVICE, AND METHOD OF CONTROLLING SAME

(75) Inventor: Masashi Kuroshima, Yokohama (JP)

(73) Assignee: Canon Kabushiki Kaisha, Tokyo (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/411,838

(22) Filed: Oct. 4, 1999

(65) Prior Publication Data

US 2003/0115255 A1 Jun. 19, 2003

(30) Foreign Application Priority Data

Oct. 6, 1998 (JP) .......................................... 10-284304

(51) Int. Cl.[7] .............................................. G06F 13/00
(52) U.S. Cl. ...................................................... 709/210
(58) Field of Search ................................. 709/200, 201, 709/202, 203, 208, 210, 218, 219, 226, 229; 710/5

(56) References Cited

U.S. PATENT DOCUMENTS 5,845,076 A * 12/1998 Arakawa ..................... 709/203
5,911,044 A * 6/1999 Lo et al. ..................... 709/203

* cited by examiner

Primary Examiner—Robert B. Harrell
(74) Attorney, Agent, or Firm—Fitzpatrick, Cella, Harper & Scinto

(57) ABSTRACT

There is provided a terminal device with which a shared unit shared with the other terminal device on a network is connected, characterized in that the terminal device comprises a transmitting/receiving section for receiving information sent from the other terminal device with respect to the shared unit, and a control section for allowing the other terminal device a right to use the shared unit based on the information sent from the other terminal device and received by the transmitting/receiving section, and for releasing a state having the right to use the shared unit, if the information sent from the other terminal device is indicative of a given instruction.

6 Claims, 11 Drawing Sheets

SERVER DEVICE THAT MANAGES A STATE OF A SHARED DEVICE, AND METHOD OF CONTROLLING SAME

BACKGROUND OF THE INVENTION

1. Field of the Invention

The present invention generally relates to a communication device, a communication system, and a recording medium in a system where a terminal device at a server site and a terminal device at a client site are both connected to a network, and more particularly to a communication device used for allowing the terminal device at the client site to use a unit connected with the terminal device at the server site, a communication system, and a recording medium stored with steps for implementing this process operation so as to be readable by a computer.

2. Related Background Art

Conventionally, there has been utilized a system called a server/client system in which a terminal device at a server site (hereinafter referred to as "server device") having various kinds of units such as image reading device connected therewith, and a plurality of terminal devices at client sites (hereinafter referred to as "client devices") are connected to a network so that a unit (shared unit) connected with the server devices can be used from the respective client devices.

In such a system, the operation of each of these devices can be controlled by a central processing unit (CPU) provided in each device which executes a given program.

In the foregoing conventional system, while a user at a certain client device (hereinafter referred to "client device A") uses a unit connected with the server device, if the client device A is down, the unit connected with the server device remains in the slave state where the client device A has a right to use the unit. Therefore, in this state, no one else may use the unit.

For this reason, a user of the client device A must go to the server site, search a process incapable of being controlled (i.e., a program causing the unit to remain in the slave state) because the client device A is down among the programs (server programs) running on the server device, and then kill that process. In this case, if the server device is located at an extremely remote place from the client device A, the user of the client device A is required to contact the user of the server device by telephone or the like to stop executing the above program.

On the other hand, when the server device is down, the client device A will not be notified that the server device is recovered and ready to start up. Accordingly, a sequence of normal commands will continue to be forwarded from the client device A to the server device. In other words, the server device is supplied with a command from the client device A without any initial process. Then, an error occurs at the server device, resulting in an abnormal termination of the server program, or suffering from such a problem that it is time-consuming to terminate an execution of a client program due to the time period required for handling the error.

In this case, therefore, the user of the client device A is required to once terminate the client program, and thereafter execute the client program again, to thereby use the unit connected with the server device.

SUMMARY OF THE INVENTION

The present invention has been made in order to overcome the foregoing drawbacks, and therefore has an object of the present invention to provide a communication device for allowing a shared unit connected to a network to be efficiently used, a communication system, and a recording medium stored with steps for implementing this process so as to be readable by a computer.

In order to attain the above object, according to one embodiment of the present invention, there is provided a terminal device with which a shared unit shared with the other terminal device on a network is connected, the terminal device comprising:

(a) transmitting/receiving means for receiving information sent from the other terminal device with respect to the shared unit; and (b) control means for allowing the other terminal device a right to use the shared unit based on the information sent from the other terminal device and received by the transmitting/receiving means, and for releasing a state having the right to use the shared unit, if the information sent from the other terminal device is indicative of a given instruction.

According to another embodiment of the present invention, there is provided a communication system in which a shared unit having a predetermined function can be shared with respective terminal devices, characterized in that the communication system comprising:

(a) a first terminal device with which the shared unit is connected; and (b) a terminal device using the shared unit, the terminal device including input means for inputting information on the shared unit, and transmitting/receiving means for transmitting the input information inputted by the input means to the first terminal device.

According to still another embodiment of the present invention, in a system including a plurality of terminal devices capable of being communicated with one another and a unit having a predetermined function, it is characterized in that a recording medium is stored with process steps so as to be readable from a computer, for sharing the unit with respective terminal devices, the process steps comprising:
a first step of sending out information on the shared unit by a terminal device that uses the shared unit;
a second step of allowing the terminal device that sent out the information a right to use the shared unit based on the information sent out in the first step, and of bring the shared unit to operate; and
a third step of releasing a state having a right to use the shared unit, if the information sent out in the first step is indicative of a given instruction.

Specifically, by way of example, a terminal device at a server site (server device) and a terminal device at a client site (client device) are connected to a network.

A unit having an image reading function (an image reading device) which is shared on a network is directly connected with the server device through no network. The server device has a device control function, a server extension function, and a network server function. The device control function serves to control the operation of the image reading device to obtain image data, or to set a given parameter for the image reading device. The server extension function serves to use an appropriate interface to transmit data to/from the image reading device, or to control the operation of the image reading device to pass the data to/from the network server function. The network server function serves to convert the data transmitted to/from the server extension function into an arbitrary network protocol.

On the other hand, the client device has a client program that corresponds to the arbitrary network protocol, and can control the operation of the image reading device shared on the network or capture the image data obtained by the image reading device.

When the client device uses the image reading device connected with the server device, information on the image reading device (e.g., information for requesting a right to use, information for operation instructions) is transmitted from the client device to the server device. With this, the client device is allowed to use the image reading device while the image reading device connected with the server device is operated (e.g., operatively scanned) by the device control function according to the instruction sent from the client device into the state where the client device is authorized to use the image reading device (slave state).

During this operation, if the client program is down, a given instruction (e.g., to designate the name of the image reading device that is currently used) sent from the client device (or from the server device or another device connected to the network, etc.) may allow this instruction information to be transmitted to the server device. This interrupts the device control function on processing to the image reading device, and releases the state having a right to use the image reading device (slave state). The image reading device is therefore ready for use at another device.

The server device further has a session number creating function, a first session number storing function, and a first session number notifying function. The session number creating function serves to create information (session numbers) for identifying the client device that is using the image reading device. The first session number storing function serves to store the session numbers created by the session number creating function. The first session number notifying function serves to notify the session numbers created by the session number creating function to the client device.

The client device has a second session number storing function for storing the session numbers notified by the first session number notifying function. The client device uses the session numbers stored by the second session number storing function to transmit the information or instruction on the image reading device to the server device.

When the information or instruction on the image reading device is transmitted from the client device, the server device identifies the session number attached thereto with the session numbers stored by the first session number storing function. As a result, the server device can determine whether or not the information or instruction is transmitted from the correct client program (the client device that is currently using the image reading device). If determined that the information or instruction is transmitted incorrectly, the server device immediately notifies the incorrect transmission to the source.

Other objects and features of the present invention will be apparent from the following description and the accompanying drawings.

DESCRIPTION OF THE PREFERRED EMBODIMENTS

Preferred embodiments of the present invention will be described below with reference with the accompanying drawings.

Figure 1:
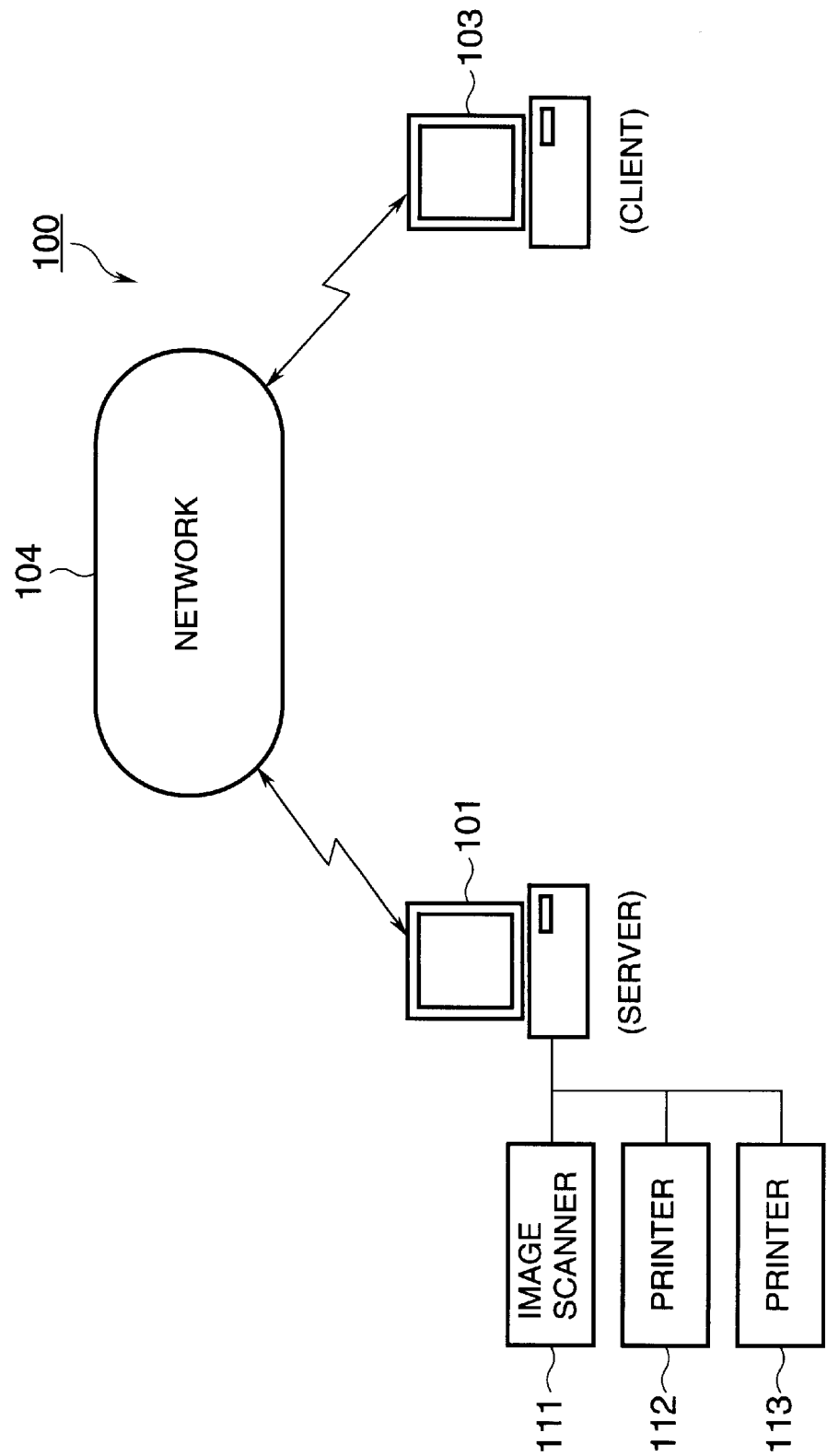
FIG. 1 is a block diagram showing a configuration of a system to which the present invention is applied.

The present invention may be applied to such a system 100 as shown in FIG. 1, by way of example.

The system 100 comprises, as shown in FIG. 1, a terminal device at a server site (server device) 101 having an image reading function, and a terminal device at a client site (client device) 103, which are connected to a network 104. An image scanner 111 functioning as an image reading device and two printers 112, 113 are connected with the server device 101.

The image scanner 111 and the printers 112, 113 which are connected with the server device 101 can be used at the client device 103, that is, shared on the network 104.

The system 100 will now be described in more detail.

For simplification of the description, a single client device 101 representative of the terminal device at the client site is connected to the network 104. However, a plurality of the client devices having a configuration similar to that of the client device 101 may be connected thereto.

[Appearance of the Server Device 101]

Figure 2:
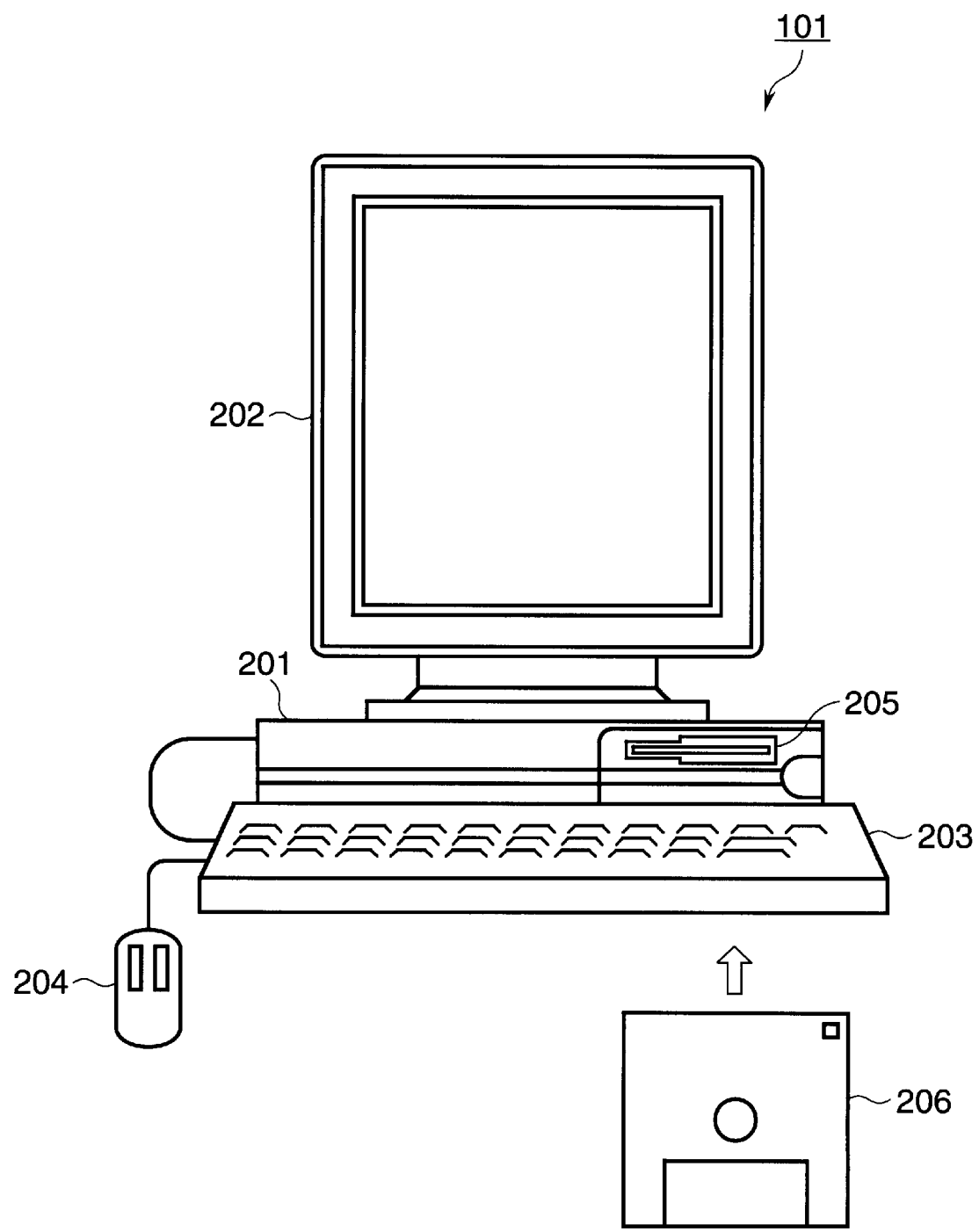
FIG. 2 is an outer view showing a server device and a client device in the system of FIG. 1.

Referring now to FIG. 2, the server device 101 is equipped with a device body 201 incorporating therein a system bus 301, a CPU 302, a program memory 303, a communication controller 304, and the like. as will be described later, a CRT 202, a keyboard 203, a mouse 204 serving as a pointing device (PD), and a floppy disk (FD) drive 205.

The FD drive 205 serves to write various data for images, graphics, characters, numerical values and the like in an FD 206 set therein, or to read the various data recorded in the set FD 206.

[Internal Configuration of the Server Device 101]

Figure 3:
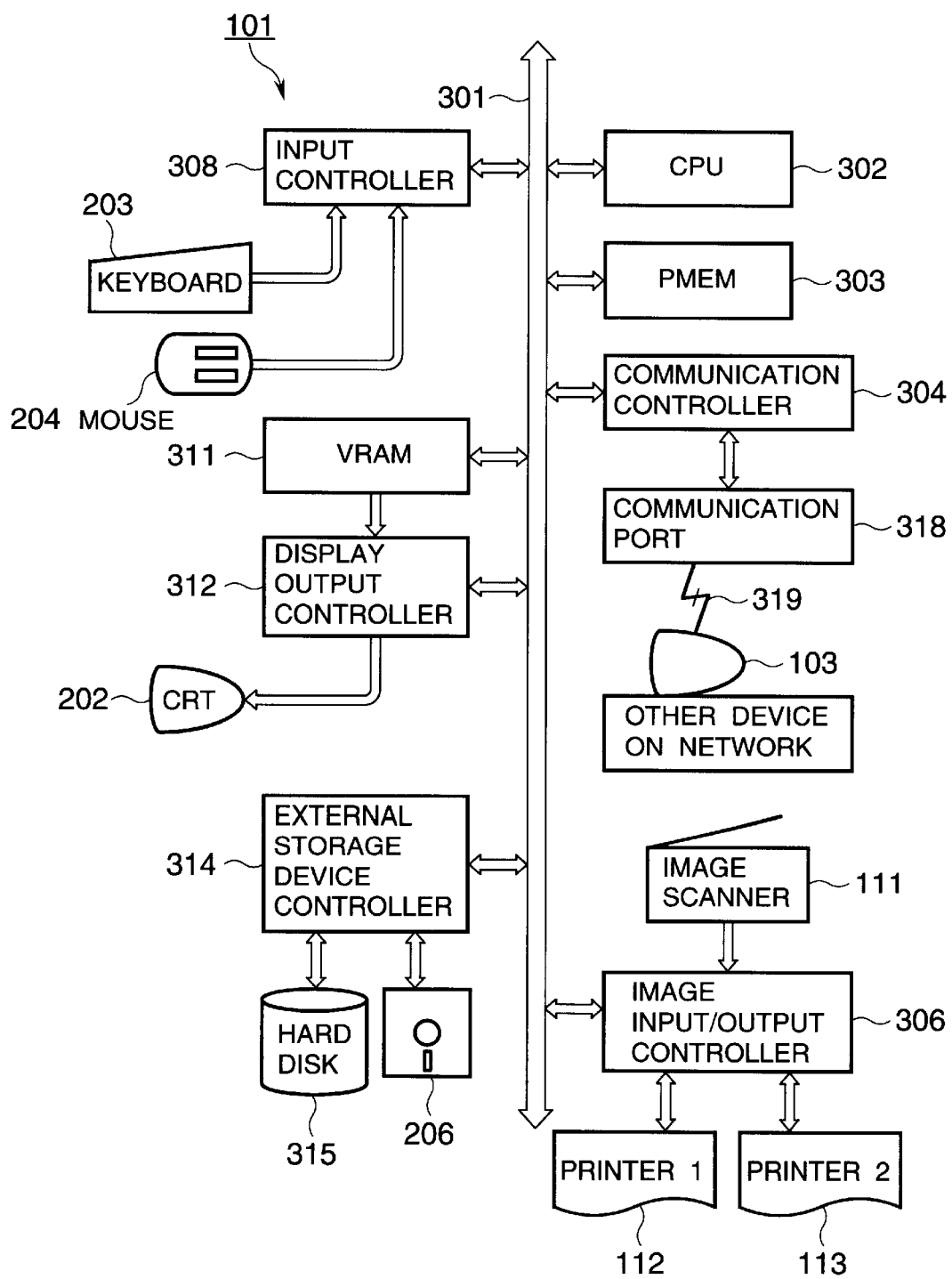
FIG. 3 is a block diagram showing an internal configuration of the server device and the client device of FIG. 2.

Referring now to FIG. 3, the server device 101 is composed of a CPU 302, a program memory (PMEM) 303, a communication controller 304 having a communication port 318 connected therewith, an image input/output controller 306 having the image scanner 111 and the printers 112, 113 (see FIG. 1) respectively connected therewith, an input controller 308 having the keyboard 203 and the mouse 204 (see FIG. 2) respectively connected therewith, a video image memory (VRAM) 311, a display output controller 312 having the CRT 202 (see FIG. 2) connected therewith, and an external storage device controller 314 corresponding to the FD drive 205 (see FIG. 2), which are connected with the system bus 301, respectively, to transmit data from one to another.

The external storage device controller 314 controls the operation of reading/writing the data in a hard disk (HD) 315 or the set FD 206.

The hard disk (HD) 315 or the FD 206 serves as a disk for data files for recording various data for images, graphics, characters, numerical values and the like, and also serves to record a processing program for controlling various kinds of operations of the whole device. It is assumed herein that the HD 315 is recorded with processing programs such as for an image reading device control function, a server extension function, and a network server function. In this case, the external storage device controller 314 suitably selects and reads out a processing program according to the necessity out of various processing programs recorded in the HD 315, and once stores the read out program in the PMEM 303 via the system bus 301.

The CPU 302 executes the processing program stored in the PMEM 303 to control the various operations (e.g., to control the operations for editing or reading images) of the whole device.

Figure 4:
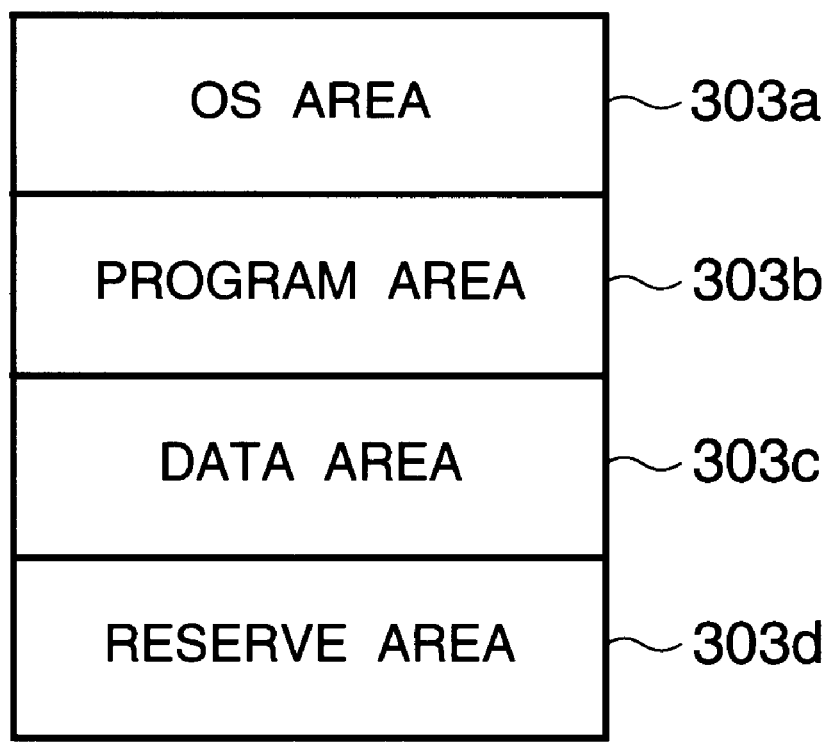
FIG. 4 is a view for illustrating a memory map of a program memory within the server device and the client device of FIG. 2.

Referring now to FIG. 4, the PMEM 303 is constituted by an OS area 303a occupied by the operating system, a program area 303b stored with various kinds of processing programs, a data area 303c used by the processing programs, and a reserve area 303d. In FIG. 4, the upper portion in the figure indicates a lower address, and the lower portion in the figure indicates an upper address.

Accordingly, the processing program read out from the HD 315 in the manner as described above is stored in the program area 303b. The processing programs in the program area 303b are executed to generate data, which are then stored in the data area 303c. The data area 303c is also used as a memory for temporarily storing the text data input by a user from the keyboard 203.

The communication controller 304 controls the input/output data at the communication port 318.

Thus, a control of the communication controller 304 allows the data output from the communication port 318 to be passed to a communication port in the other device (here, the client device 103) on the network 104 via a communication line 319.

The image scanner 111 and the printers 112, 113, which are connected with the server device 101 and shared on the network 104, transmit the data to/from the client device 103 via the communication controller 304.

The image scanner 111 scans a document set in place, and reads an image (image data) on the document. The read image data is once developed in the PMEM 303 by the control of the image input/output controller 306, followed by being developed onto the VRAM 311, and then displayed on the CRT 202 by the control of the display output controller 312.

In the VRAM 311, the image data once developed in the PMEM 303 is developed as bit map data. If the image data of interest is, for example, graphic data, the graphic patterns corresponding to its position and drawing attributive information will be developed onto the VRAM 311. Now, a control of the CPU 302 (software control) allows a cursor to be directly produced in a display area of the VRAM 311 so that the cursor can be displayed on the CRT 202.

The keyboard 203 is used to input text data or operation commands to the device, etc.

The mouse 204 is used to select desired information data out of the various information for images, graphics, characters, or numerical values displayed on the CRT 202, to instruct image processing, or to set parameters required to read the image data in the image scanner 111. In other words, the mouse 24 is operated to move the above-described mouse cursor on the CRT 202 freely in the X direction or the Y direction, and then clicked on given positions so that the above information data can be selected, processed, and set.

This input information from the keyboard 203 and the mouse 204 is supplied to the CPU 302 via the system bus 301 by the control of the input controller 308.

[Appearance and Internal Configuration of the Client Device 103]

The appearance and the internal configuration of the client device 103 is similar to the appearance and the internal configuration of the server device 101 which have been described in conjunction with FIGS. 2 and 3. Therefore, the detailed description thereof will be omitted.

[Internally Operational Configuration of the Server Device 101]

Figure 5:
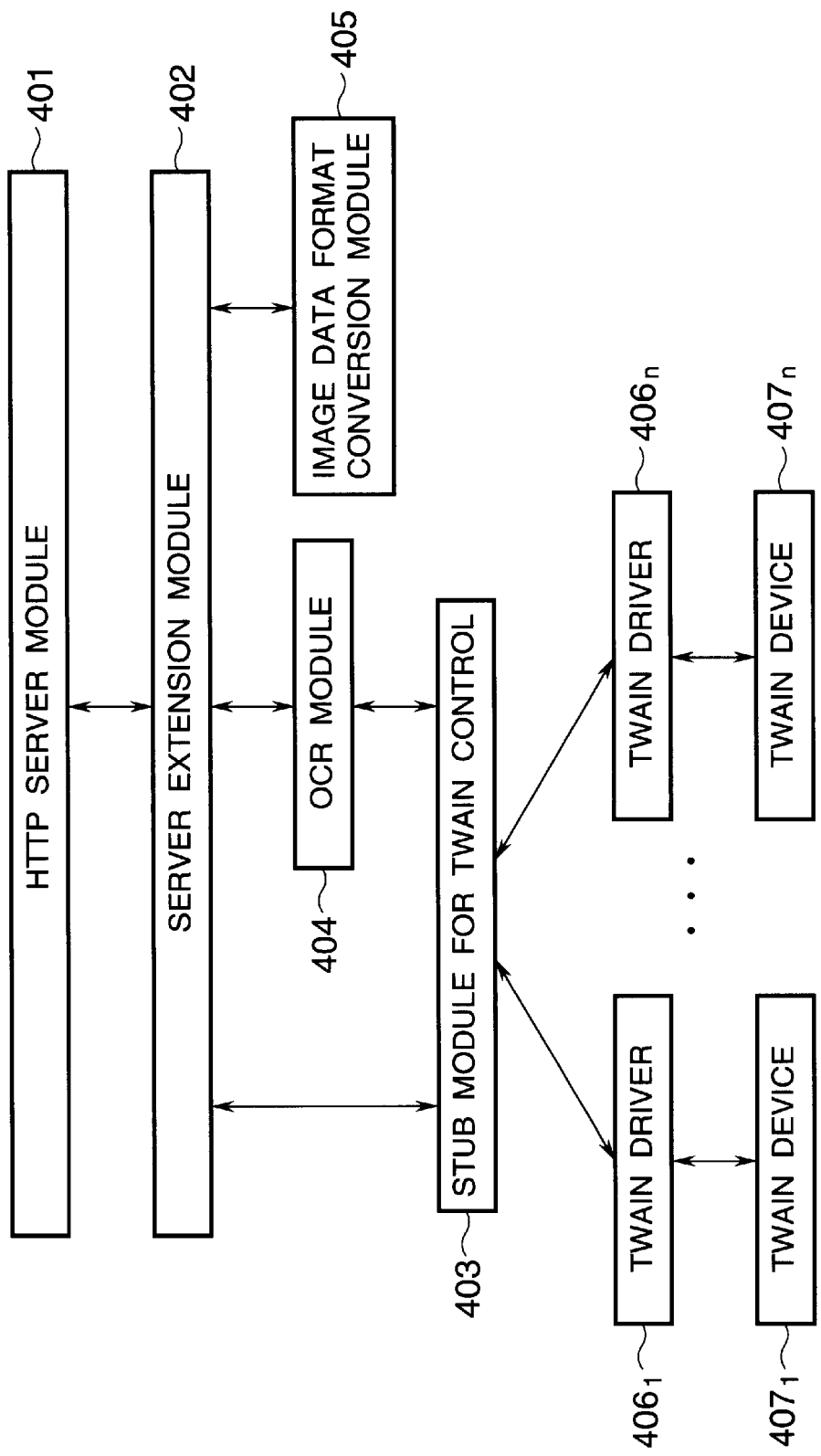
FIG. 5 is a view for describing a configuration of an internal function of the server device of FIG. 2.

FIG. 5 shows an internally operational configuration of the server device 101.

A TWAIN device having a universal interface is used herein as the image scanner 111 and the printers 112, 113 connected with the server device 101. Also, HTTP (HyperText Transfer Protocol) protocol is used as a commonly used network protocol for controlling transmission of the image data read by the image scanner 111.

An HTTP server module 401 using the HTTP protocol sends the data generated by the server device 101 to the client device 103, or passes the information directed from the client device 103 to a server extension module 402.

The server extension module 402 interprets the information passed from the HTTP server module 401 to control a STUB module for TWAIN control 403, an OCR module 404, and an image data format conversion module 405. The server extension module 402 finally takes advantage of the HTTP server module 401 to send the client device 103 the image data that is read by, for example, a TWAIN device $407_x$ compatible with the image scanner 111 among a plurality of TWAIN devices $407_1$ to $407_n$ connected with the server device 101.

A plurality of TWAIN drivers $406_1$ to $406_n$ control the TWAIN devices $407_1$ to $407_n$, respectively, which are connected with the server device 101.

Therefore, since the STUB module for TWAIN control 403 takes advantage of the universal TWAIN interface to transmit to/from these drivers $406_1$ to $406_n$, a set of the modules of the present invention can be used to share on the network any TWAIN device (and the TWAIN driver corresponding thereto) among the TWAIN devices $407_1$ to $407_n$.

For example, the STUB module for TWAIN control 403 performs a list-up process for the TWAIN drivers $406_1$ to $406_n$, and a selection process of a TWAIN driver $406_x$ (a driver for the image scanner 111) among the TWAIN drivers $406_1$ to $406_n$ according to the instruction from the client device 103. Then, the STUB module for TWAIN control 403 sets parameters for the selected driver, and passes the thus obtained image data (image data read by the image scanner 111) to the server extension module 402.

The OCR module 404 is called from the server extension module 402 when the client device 103 makes a request to interpret the image data read by the TWAIN device $407_x$ (image scanner 111) as document data.

The image data format conversion module 405 converts a format of the image data read by the TWAIN device $407_x$ (image scanner 111) into the format designated by the client device 103.

[Internally Operational Configuration of the Client Device 103]

Figure 6:
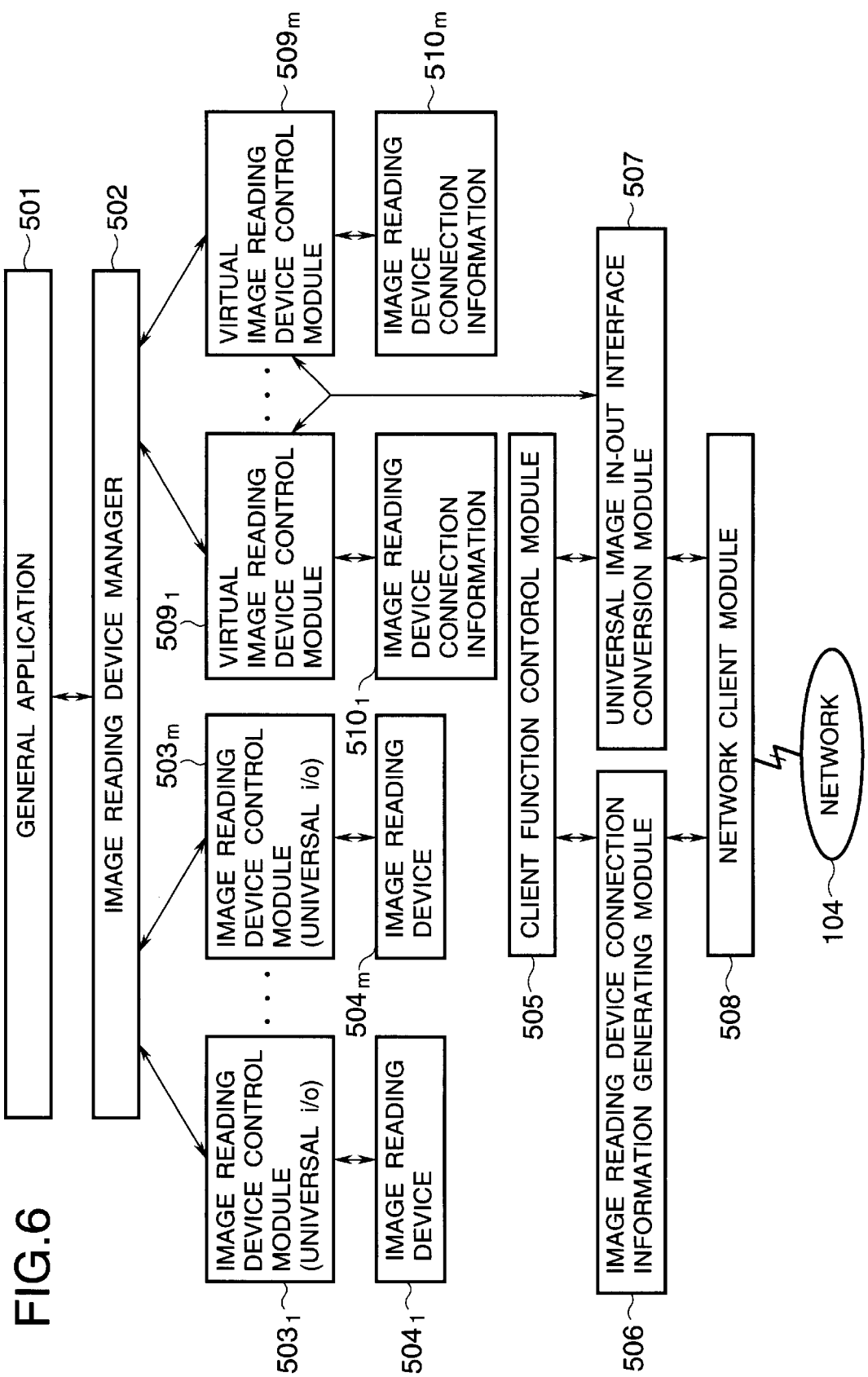
FIG. 6 is a view for illustrating a configuration of an internal function of the client device of FIG. 2.

FIG. 6 shows an internally operational configuration of the client device 103.

Referring now to FIG. 6, a general application 501, an image reading device manager 502, and a plurality of image reading device control modules (universal i/o) $503_1$ to $503_m$ are essential components required for accessing a plurality of image reading devices $504_1$ to $504_m$ that are locally connected with the client device 103 (such devices as the image scanner 111 shown in FIG. 1).

The essential components required for capturing the image data by the image reading function (the image scanner 111) possessed by the server device 101 are shown in FIG. 6, including a client function control module 505, an image reading device connection information generating module 506, a universal image in-out interface conversion module 507, a network client module 508, a plurality of virtual image reading device control modules $509_1$ to $509_m$, and a plurality of image reading device connection information 510l to 510m.

The general application 501 has an image input function, and the image reading device manager 502 provides a universal image in-out interface for the application 501. Thus, the image reading device manager 502 transmits the information to/from the module designated among the image reading device control modules $503_1$ to $503_m$ under its control, according to the instruction by the image in-out interface. The image reading device control modules $503_1$ to $503_m$ are modules having a universal i/o, and control the image reading devices $504_1$ to $504_m$ that are respectively connected therewith through the universal interface defined to/from the image reading device manager 502.

In one example, the image reading device manager 502 is a TWAIN manager, and the image reading device control modules $503_1$ to $503_m$ correspond to TWAIN drivers compatible with the plurality of image reading devices $504_1$ to $504_m$ connected with the client device 103.

The client function control module 505 generally manages modules individually constituting the client extension function, such as the image reading device connection information generating module 506 or the universal image in-out interface conversion module 507, as will be described later.

The image reading device connection information generating module 506 captures attributive information of the image reading function (the image scanner 111) possessed by the server device 101 which is obtained using the network client module 508, and the information required for the network connection, to individually generate the image reading device connection information $510_1$ to $510_m$. Concurrently with this, the virtual image reading device control modules $509_1$ to $509_m$ are automatically generated. Since these modules are thus generated, the image reading device manager 502 can proceed as if there were a virtual connection of the unit on the network 104 (such a device as the image scanner 111 connected with the server device 101).

The universal image in-out interface conversion :module 507 converts the control information data for the unit connected with the server device 101 (e.g., image scanner 111) which is obtained using the network client module 508 to a universal interface compatible with the image reading device manager 502. This module provides the functions with the interface for the image reading device manager 502 via the virtual image reading device control modules $509_1$ to $509_m$, instead of directly.

The network client module 508 converts into a data format participating in the universal network protocol so as to be transmitted over the network 104 to/from the image reading device connection information generating module 506 and the universal image in-out interface conversion module 507 from/to the module possessed by the server device 101 (see FIG. 5 as above).

The virtual image reading device control modules $509_1$ to $509_m$ are produced in correspondence with the unit to be shared on the network 104 (e.g., the image scanner 111 and the printers 112, 113 connected with the server device 101). This module inherently only performs intermediary processes; that is, it sends back the data of the corresponding image reading device connection information $510_1$ to $510_m$, or it passes that data to the universal image in-out interface conversion module 507, followed by passing the result obtained therefrom to the image reading device manager 502, etc. In this way, the major portions of the actual processing are performed by the universal image in-out interface conversion module 507. Therefore, The modules $509_1$ to $509_m$ may be small-sized, with less overhead even though a plurality of modules for image reading devices are created on the network 104.

[Release of a Unit in the Slave State]

Figure 7:
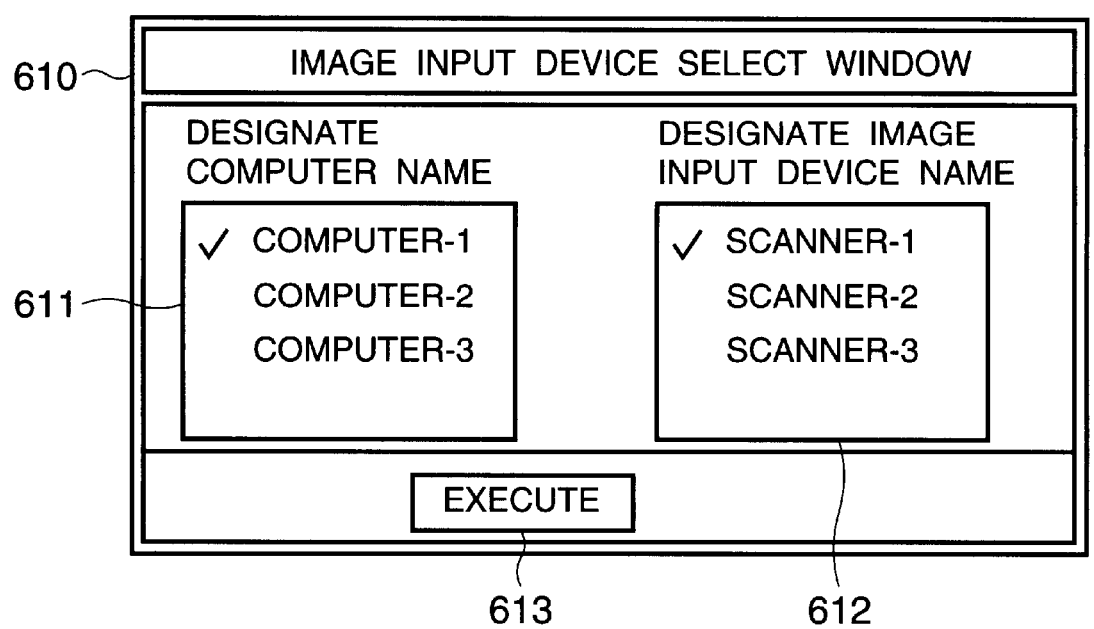
FIG. 7 is a view for illustrating a window for releasing the slave state of a shared unit connected to a network in the system.

Referring now to FIG. 7, a window (an image input device select window) 610 can release a unit in the slave state.

In one example, while one at the client device 103 is using the image scanner 111 connected with the server device 101, if the client device 103 is down, the window 610 displayed on the CRT 202 of the client device 103 allows the image scanner 111 connected with the server device 101 to be released from the slave state where the client device 103 has a right to use the image scanner 111.

More specifically, the window 610 serves as a select dialogue for selecting the unit to be released from the slave state (e.g., the image scanner 111 connected with the server device 101). The window 610 includes a list box 611 indicative of "computer select" for designating the terminal device (computer) with which the unit is connected, and a list box 612 indicating the name of the unit with which the computer selected in the list box 611 is locally connected.

As used herein, the selected computer is given by a check mark ("✓"). It is also assumed that all the names of the computers are indicated which are connected within the same domain as the client device 103 on the network 104. The selected unit is also given by a check mark ("✓"). This select is carried out by operating the mouse 204 previously shown in FIG. 2 to move the pointer having a motion in communication with that operation onto the name of a desired computer or unit and then clicking the button on the mouse 204. Otherwise, this select is carried out by key input from the keyboard 203.

The window 610 is also formed with an "EXECUTE" button 613. In the case where a release of the selected unit in the list boxes 611 and 612 from the slave state is executed, the mouse 204 or the keyboard 203 is operated in the manner as described above to clock the "EXECUTE" button 613. As a result, an instruction to release the slave state (slave release) will be executed.

Figure 8:
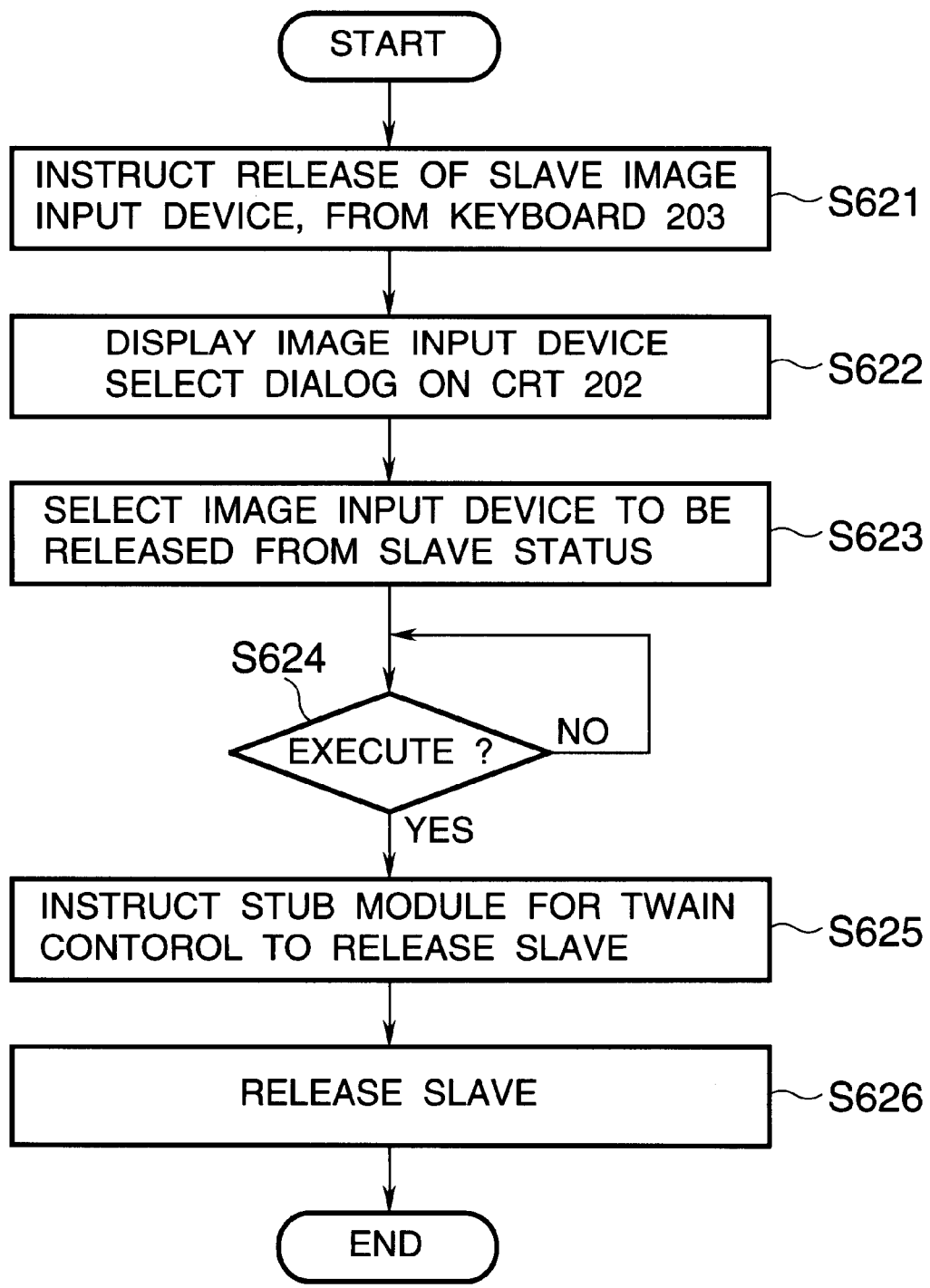
FIG. 8 is a flow chart for describing a process used to release the slave state of FIG. 7.

FIG. 8 is a flow chart showing an exemplary flow in which the slave release is executed at the window 610 of FIG. 7 in the manner described above.

It is assumed herein that the following operation has been made prior to the execution of the above slave release.

In the client device 103, for example, a desired unit among the shared units on the network 104, given the image scanner 111 connected with the server device 101, is selected on a given window displayed on the CRT 202. Then, an instruction for the image read-in mode is issued. This instruction is supplied to the server device 101 over the network 104 (slave request), causing the image scanner 111 to be in the slave state by the client device 103. The image scanner 111 then scans a document set in place, and reads image data on the document. The read image data is supplied to the client device 103 over the network 104. Given that the client device 103 is down during such a operation.

First, an instruction for executing the process (executing the process of the application 501: see FIG. 6 in conjunction with the previous description) is entered to the client device 103 from the keyboard 203 (Step S621). Based on this instruction, the window 610 as previously shown in FIG. 7 is displayed on the CRT 202 (Step S622).

Then, the computer (the server device 101) with which the unit to be slave-released (the image scanner 111) is connected is selected in the list box 611 in the manner described above. That unit (the image scanner 111) is also selected in the list box 512 (Step S623).

Then, the instruction to execute the slave release of the unit selected at Step S623 is entered by the "EXECUTE" button 613 on the window 610. The device remains in a standby mode until this instruction is entered (Step S624).

The instruction entered at Step S624 is supplied to the server device 101 over the network 104, utilizing the network client module 508 (see FIG. 6 in conjunction with the foregoing description), from the slave release program of the application.

The server device 101 instructs the STUB module for TWAIN control 403 (see FIG. 5 in conjunction with the foregoing description) to release the unit (the image scanner 111) selected by the client device 103 from the slave state (Step S625). Accordingly, the STUB module for TWAIN control 403 is used to release the slave state of the image scanner 111 (Step S626).

It will be noted that the slave release for the above-described unit can be carried out not only from the client device 103 but also from the server device 101, or any other device connected on the network 104.

On the window 610 at Step S622 is also indicated computer names of that unit in the list box 611 for indicating computer names. When that unit is selected in the list box 611, the name of a local unit connected with that unit is indicated in the other list box 612. This also makes it possible to release the slave state of the local unit connected with that unit. In this case, the instruction to execute the slave release which is entered at Step S624 is supplied directly to the STUB module for TWAIN control 403, instead of over the network 104, from the slave release program of the application, allowing the STUB module for TWAIN control 403 to release the slave state of the local unit.

Figure 9:
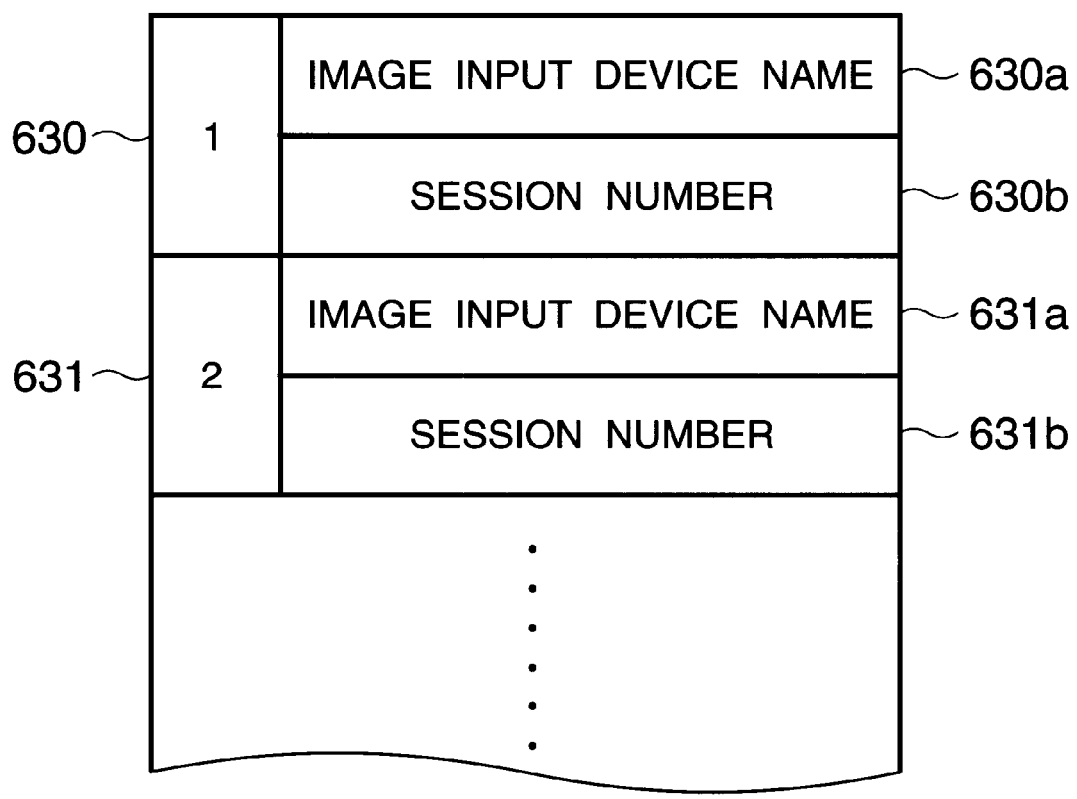
FIG. 9 is a view showing a table for managing the access state of the shared unit.

FIG. 9 shows a table for an access management to a unit within the STUB module for TWAIN control 403.

This table is made up of information areas 630, 631, . . . of the unit that currently remains in the slave state, in which an additional information area is added with an increment of the unit in the slave state. Each of the information areas consists of an area to be recorded with the unit name, and an area to be recorded with the session number corresponding to that unit as will be described later. In an example, an information area 630 with area number "1" is formed of a unit name area 630a and a session number area 630b. When the slave state of the unit is released in the manner described above, then the information area corresponding to that unit will be deleted. Further, this table will be cleared if the server device 101 is down.

That is, the STUB module for TWAIN control 403 possesses the table shown in FIG. 9, and manages the current access state to the unit on the network 104 in such a manner as follows. That is, upon receipt of the slave request, an additional information area corresponding to that unit is added, while upon receipt of the instruction to release the slave state, the information area corresponding to that unit is deleted.

Figure 10:
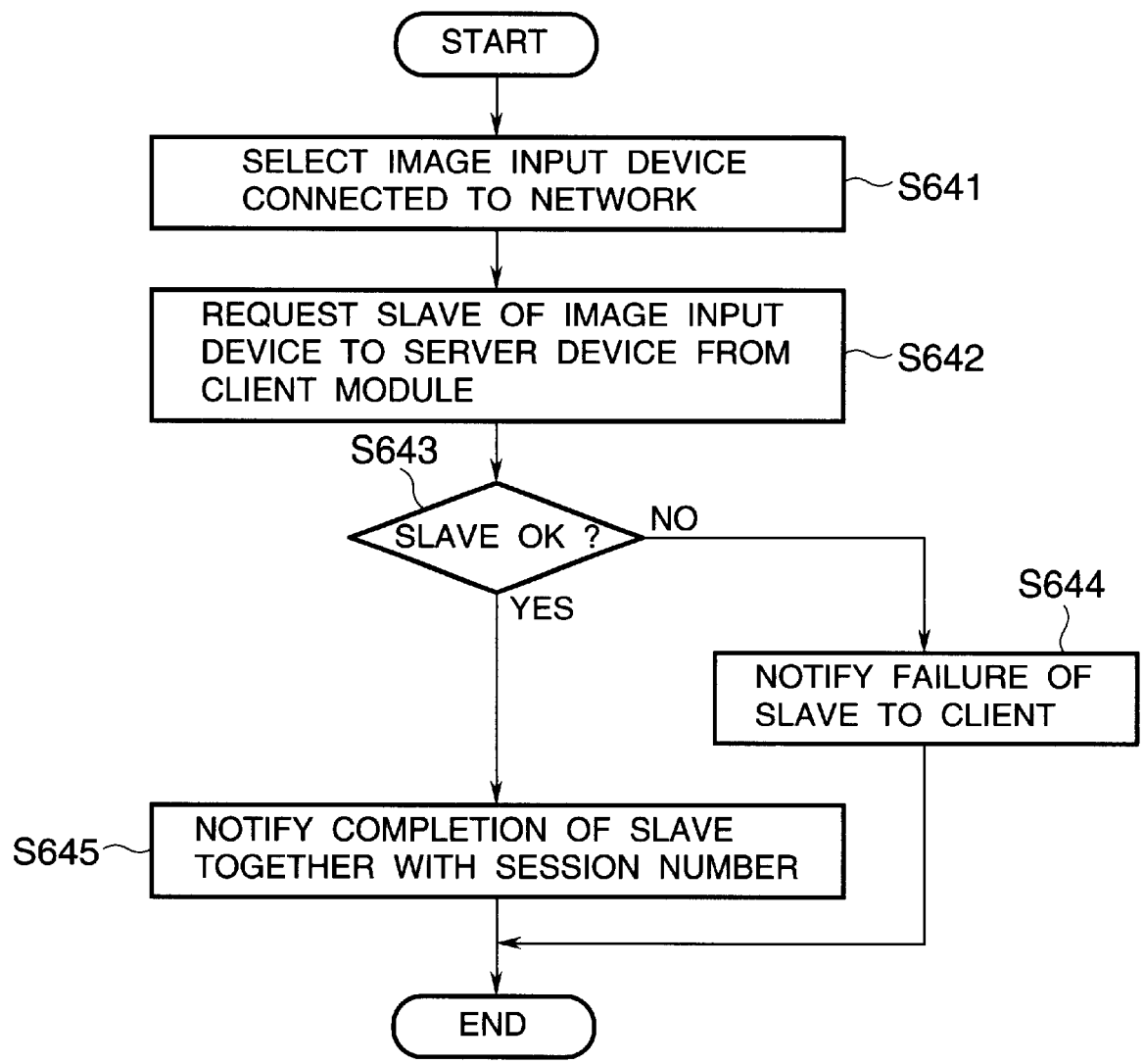
FIG. 10 is a view for describing a process of creating session numbers of the unit recorded in the table of FIG. 9.

FIG. 10 is a flow chart showing an exemplary processing which refers to occurrence of session numbers in the table of FIG. 9.

First, the general application 51 is executed at the client device 103 in the manner described above to then select a unit connected to the network 104 (herein, the image scanner 111) through the keyboard 203 or the mouse 204 (Step S641).

Then, a slave request for the image scanner 111 is issued from the client device 103 to the STUB module for TWAIN control 403 connected with the server device 101 (Step S642).

Next, it is determined at the server device 101 whether or not the STUB module for TWAIN control 403 accepts the slave request from the client device 103 (Step S643). The table shown in FIG. 9 is employed for this determination. For example, it is determined whether or not the unit name identical with the image scanner 111 for which the slave request is currently issued has been recorded in the table.

When it is determined at Step S643 that the unit name identical with the image scanner 111 has been recorded in the table, it means that the image scanner 111 has already been in the slave state. The STUB module for TWAIN control 403 then notifies a "rejection" against the slave request issued at Step S642 (Step S644). Then, the process completes.

On the other hand, if it is determined at Step S643 that the unit name identical with the image scanner 111 has not been recorded in the table, the STUB module for TWAIN control 403 creates an appropriate new session number, and adds (registers) the new session number as well as the name of the image scanner 111 to the table. The STUB module for TWAIN control 403 then notifies the newly registered session number to the client device 103 (Step S645). Then, the process completes, and the server device 101 and the client device 103 execute various kinds of operations using the newly registered session number, respectively.

Figure 11:
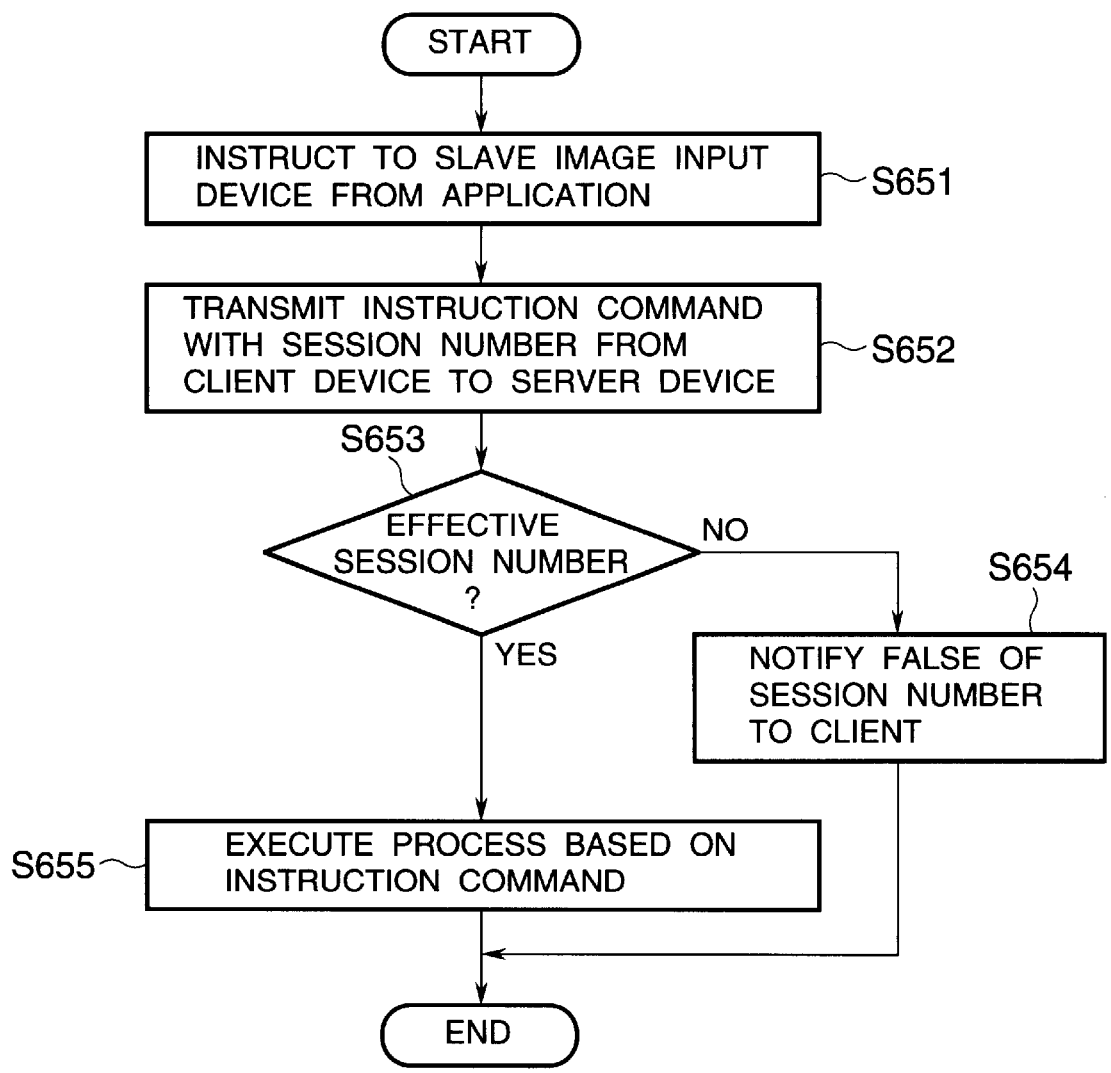
FIG. 11 is a view for describing a process using the session numbers of FIG. 10.

FIG. 11 is a flow chart showing an exemplary processing using the session number created at Step S645 of FIG. 10.

When an instruction (e.g., to initiate the scanning operation) for a unit (the image scanner 111 in this example) is entered to the client device 103 from the keyboard 203 (step S651), the entered instruction information, as well as the name of the image scanner 111 and the session number notified by the server device 101, is forwarded to the STUB module for TWAIN control 403 connected with the server device 101 from the application 510 via the network client module 508 (Step S652).

The STUB module for TWAIN control 403 at the server device 101 looks up (searches) the table shown in FIG. 9 to determine whether or not the information composed of a set of the name and the session number of the unit (the image scanner 111) which is forward from the client device 103 has been registered (Step S653).

As a result of the determination at Step S653, if registered, the STUB module for TWAIN control 403 executes the processing according to the received instruction information that is accompanied with the name and the session number of the unit (Step S655). Then, the process completes.

On the other hand, as a result of the determination at Step S653, if not registered, the STUB module for TWAIN control 403 identifies the instruction information accompanied with the name and the session number of the unit as false, and notifies a "rejection" against the instruction information to the transmission source (the client device 103) (Step S654). Then, the process completes.

As described above, according to the present embodiment, the table shown in FIG. 9 is provided within the STUB module for TWAIN control 403 at the server device 101, and this table is used to manage the access state to a shared unit (e.g., the image scanner 111) connected to the network 104. Even through the client device 103 that is using that unit is down during the use of that unit, the window 610 shown in FIG. 7 makes it possible to release the slave state of the unit at the client device 103. Therefore, there is no requirement for the user of the client device 103 to go to the server device 101 site to manipulate the release of the slave state of the unit.

Further, the table of FIG. 9 is constituted by the set of the unit name and the session number created upon receipt of a correct slave request to manage the access state of the shared unit connected to the network 104, thereby preventing any false access to that unit.

Further, the table of FIG. 9 is cleared if the server device 101 is down while the shared unit connected to the network 104 is in the slave state, whereby the instruction issued to that unit from the client device, which was allowed to use that unit, may be rejected even if this client device has just used that unit. This can prevent any disadvantage in that a system down is caused by executing somewhat process without initial process, or the error handling therefor is time-consuming.

While the network 104 according to the present embodiment is a network such as LAN, it is not limited thereto, but may be the public switched telephone network.

Further, in the foregoing description, the slave request or slave release is issued from the client device 103 to the server device 101; however, this issue may be given to the unit connected with the server device from the application within the server device 101. In any case, a similar process to the process described above is executed.

Further, in the foregoing description, in order to designate the unit to be used by the client device 103, the name of that unit is used; however, the SCSI ID number may be useful if that unit is connected via SCSI. In other words, any information for uniquely designating a unit may be available.

Further, in the foregoing description, the image scanner 111 connected with the server device 101 is used by the client device 103; however, the printers 112, 113 connected with the server device 101 in the same manner, or any other image scanner or printer not shown, as well as various types of units connected with any other server device may be available.

Further, in the foregoing description, the unit at the server device, which is connected within the same domain of the client device 103 is designated by the client device 103. However, it goes without saying that a unit connected within any other domain may also be available.

Further, in the foregoing description, while the shared unit on the network 104 is a TWAIN device, it is not limited thereto, but may be a unit having any other interface.

Furthermore, of course, the present invention may be implemented in the server device 101 or the client device 103, etc, having the above-described processing programs in the HD 315.

In other words, it goes without saying that the present invention may be achieved by supplying the recording medium stored with the program code of the software feasible in the host and terminal functions in accordance with the foregoing embodiment to any other system or server device or client device, where a computer in that system or device (or CPU or MPU) reads the program code stored in the recording medium. In one example, the FD stored with an image reading device control function program, a server extension function program, and a network server function program is set into an FD drive of any other server device. Then, the programs stored in the FD are once loaded into the HD of the device, and executed. Such an arrangement enables the present invention to be also implemented in any other server device.

In this case, the program code read out from the recording medium can attain by itself the function in accordance with the embodiment, allowing the recording medium stored with the program code to embody the present invention. The storage media for supplying the program code include a ROM, a floppy disk, a hard disk, an optical disk, an optical-magnetic disk, a CD-ROM, a CD-R, a magnetic tape, and a nonvolatile memory card.

The program code read out by the computer is executed to embody the function in accordance with the embodiment. In addition, it goes without saying that this involves that the OS or the like running on the computer performs a portion or the whole of the actual processing according to the instruction of the program code, which may attain the function in accordance with the embodiment.

It goes without saying that this also involves the following case. The program code read out from the recording medium is written into a memory equipped with an extension function board inserted into a computer or a function extension unit connected with a computer. Thereafter, a CPU equipped with the extension function board or the function extension unit performs a portion or the whole of the actual processing according to the instruction of the program code, which may attain the function in accordance with the embodiment.

As has been described, according to the present embodiment, in the case where a device is down during using a shared unit on a network, etc., that device performs a given instruction (e.g., to enter information containing the name of that unit), allowing the unit to be forcibly released from the state having a right to use (slave state). With such an arrangement, the slave state of the shared unit can be readily released at that device site. Therefore, there is no requirement for the user thereof to go to the device site with which the shared unit is connected, to manipulate the release of the slave state of the unit (e.g., manipulate to stop executing the program in a slave manner). If the unit in use is remote from that device, there is no need for extremely time-consuming task such as contact by telephone with a user of the device site with which the shared unit is connected to release the slave state of the unit as in the conventional one.

Further, according to the present embodiment, the information (e.g., session number) for identifying the name of the shared unit and the device that is using the shared unit is used to manage the state of using (access state) the shared unit on a network. This allows an immediate error notification to the device that is to access the unit using false information. Therefore, this can prevent any illegal processing from causing abnormality on the system program, while facilitating the processing within the device that is using the shared unit.

What is claimed is:

1. A server device connected to a shared unit and a plurality of terminal devices via a network, said server device comprising:

a management unit adapted to manage a state of the shared unit;

a first reception unit adapted to receive a request for a right to use the shared unit from one of the plurality of terminal devices;

a first control unit adapted to change the state of the shared unit into a slave state, according to the request for the right to use the shared unit;

a second reception unit adapted to receive a request for releasing the right to use the shared unit from the terminal device which sent the request for the right to use the shared unit to the first reception unit; and a second control unit adapted to change the state of the shared unit into a released state, according to the request for releasing the right to use the shared unit.

2. A server device according to claim 1, wherein the shared unit includes a unit with at least an image reading function, wherein the first control unit controls the shared unit to perform an image reading process, and image information obtained through the image reading process is transmitted to a second terminal device.

3. A server device according to claim 1, wherein the shared unit is locally connected to said server device.

4. A server device according to claim 1, wherein the shared unit is available from a terminal device via said server device.

5. A control method of controlling a server device connected to a shared unit and a plurality of terminal devices via a network, the method comprising the steps of:

managing a state of the shared unit;

receiving a request for a right to use the shared unit from one of the plurality of terminal devices;

changing the state of the shared unit into a slave state, according to the request for the right to use the shared unit;

receiving a request for releasing the right to use the shared unit from the terminal device which sent the request for the right to use the shared unit; and changing the state of the shared unit into a released state, according to the request for releasing the right to use the shared unit.

6. A computer-readable medium containing program codes for a control method of controlling a server device connected to a shared unit and a plurality of terminal devices via a network, the method comprising the steps of:

managing a state of the shared unit;

receiving a request for a right to use the shared unit from one of the plurality of terminal devices;

changing the state of the shared unit into a slave state, according to the request for the right to use the shared unit;

receiving a request for releasing the right to use the shared unit from the terminal device which sent the request for the right to use the shared unit; and changing the state of the shared unit into a released state, according to the request for releasing the right to use the shared unit.

* * * * *

UNITED STATES PATENT AND TRADEMARK OFFICE
CERTIFICATE OF CORRECTION

PATENT NO. : 6,754,695 B2
DATED : June 22, 2004
INVENTOR(S) : Masashi Kuroshima

It is certified that error appears in the above-identified patent and that said Letters Patent is hereby corrected as shown below:

Drawings,
Sheet 6, Fig. 6, "CONTOROL" should read -- CONTROL --.
Sheet 8, Fig. 8, "CONTOROL" should read -- CONTROL --.

Column 2,
Line 47, "bring" should read -- being --.

Column 4,
Line 45, "like." should read -- like, --.

Column 7,
Line 54, ": module" should read -- module --.

Column 8,
Line 15, "The" should read -- the --.

Column 9,
Line 4, "a" should read -- an --.

Signed and Sealed this

Twenty-eighth Day of December, 2004

JON W. DUDAS
*Director of the United States Patent and Trademark Office*